(12) United States Patent
Beaurepaire

(10) Patent No.: US 10,690,505 B2
(45) Date of Patent: *Jun. 23, 2020

(54) METHOD AND APPARATUS FOR PRESENTING A COMPARISON OF PROGRESS INFORMATION ASSOCIATED WITH TRANSPORT MODES OR ROUTES

(71) Applicant: HERE GLOBAL B.V., Eindhoven (NL)

(72) Inventor: Jerome Beaurepaire, Berlin (DE)

(73) Assignee: HERE Global B.V., Veldhoven (NL)

( * ) Notice: Subject to any disclaimer, the term of this patent is extended or adjusted under 35 U.S.C. 154(b) by 198 days.

This patent is subject to a terminal disclaimer.

(21) Appl. No.: 15/807,058

(22) Filed: Nov. 8, 2017

(65) Prior Publication Data

US 2018/0073880 A1    Mar. 15, 2018

Related U.S. Application Data

(63) Continuation of application No. 13/484,471, filed on May 31, 2012, now Pat. No. 9,857,185.

(51) Int. Cl.
G01C 21/34 (2006.01)

(52) U.S. Cl.
CPC ................. *G01C 21/3423* (2013.01)

(58) Field of Classification Search
CPC ................................. G01C 21/3423
See application file for complete search history.

(56) References Cited

U.S. PATENT DOCUMENTS

| 8,135,538 B2 | 3/2012 | Geelen et al. |
| 2006/0184314 A1 | 8/2006 | Couckuyt et al. |
| 2007/0010941 A1 | 1/2007 | Marsh |
| 2007/0179709 A1 | 8/2007 | Doyle |
| 2008/0215237 A1 | 9/2008 | Perry |
| 2009/0005018 A1 | 1/2009 | Forstall et al. |
| 2009/0005964 A1 | 1/2009 | Forstall et al. |
| 2009/0043498 A1 | 2/2009 | Maethner |
| 2009/0119001 A1 | 5/2009 | Moussaeiff et al. |
| 2010/0010732 A1 | 1/2010 | Hartman |

(Continued)

FOREIGN PATENT DOCUMENTS

WO    2002016457 A2    2/2002

OTHER PUBLICATIONS

Baumann et al., "The Importance of Computing Intermodal Roundtrips in Multimodal Guidance Systems", Proceedings of the 4th Swiss Transport Research Conference(STRC), Mar. 25-26, 2004, 14 Pages.

*Primary Examiner* — Michael D Lang

(74) *Attorney, Agent, or Firm* — Ditthavong & Steiner, P.C.

(57) ABSTRACT

An approach for presenting a comparison of progress information associated with transport modes, routes, or a combination thereof is described. A transport comparison platform determines progress information for at least one device associated with at least one mode of transport, at least one route, or a combination thereof. The transport comparison platform determines other progress information associated with at least another mode of transport, at least another route, or a combination thereof. The transport comparison platform causes, at least in part, a presentation of a comparison of the progress information against the other progress information.

19 Claims, 12 Drawing Sheets

(56) References Cited

U.S. PATENT DOCUMENTS

| | | |
|---|---|---|
| 2010/0228574 A1 | 9/2010 | Mundinger et al. |
| 2010/0312466 A1 | 12/2010 | Katzer et al. |
| 2011/0029231 A1 | 2/2011 | Mueller et al. |
| 2011/0313633 A1* | 12/2011 | Nath .................. G01C 21/3691 701/70 |
| 2012/0035848 A1 | 2/2012 | Yonezawa et al. |

* cited by examiner

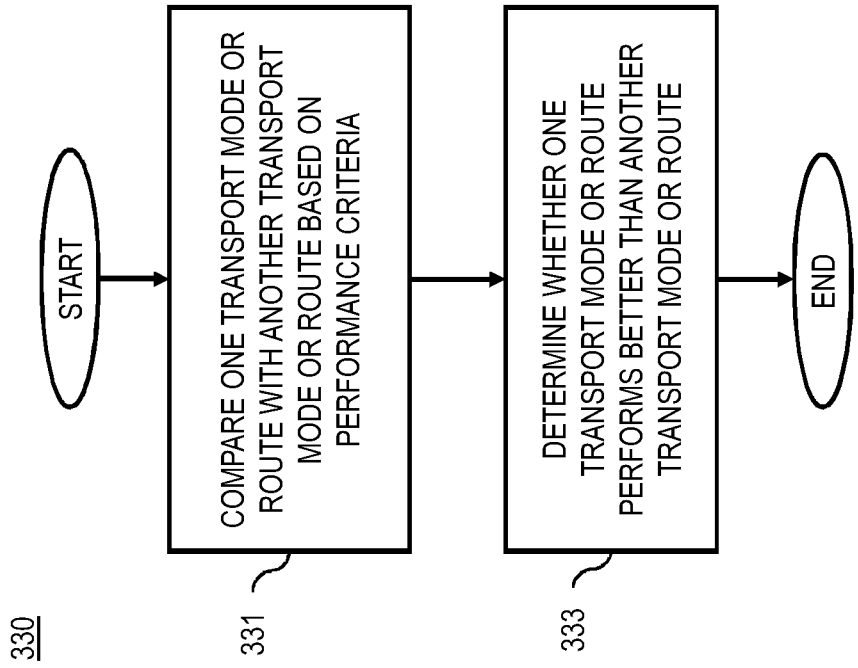

METHOD AND APPARATUS FOR PRESENTING A COMPARISON OF PROGRESS INFORMATION ASSOCIATED WITH TRANSPORT MODES OR ROUTES

CROSS REFERENCE TO RELATED APPLICATION

This application is a continuation of U.S. application Ser. No. 13/484,471, filed May 31, 2012 and titled "Method and Apparatus for Presenting a Comparison of Progress Information Associated with Transport Modes or Routes", which is hereby incorporated herein in its entirety by reference.

BACKGROUND

Service providers and device manufacturers (e.g., wireless, cellular, etc.) are continually challenged to deliver value and convenience to consumers by, for example, providing compelling trip planning applications and services that enable users to determine possible transport modes or routes between two location points associated with a trip. In general, these trip planning applications identify and present the possible transport modes or routes upon user input for user comparison before the start of the trip, allowing users to choose a transport mode or route based on predicted travel time. However, actual travel times associated with transport modes or routes are often different from travel times predicted by such applications (e.g., due to unexpected events or other factors that were not considered). Nonetheless, because users are typically limited to knowing the actual travel time of the transport mode or route taken, they are unable to make well-informed decisions in the future with respect to transport mode or route selections.

SOME EXAMPLE EMBODIMENTS

Therefore, there is a need for an approach for presenting a comparison of progress information associated with transport modes, routes, or a combination thereof.

According to one embodiment, a method comprises determining progress information for at least one device associated with at least one mode of transport, at least one route, or a combination thereof. The method also comprises determining other progress information associated with at least another mode of transport, at least another route, or a combination thereof. The method further comprises causing, at least in part, a presentation of a comparison of the progress information against the other progress information.

According to another embodiment, an apparatus comprises at least one processor, and at least one memory including computer program code for one or more computer programs, the at least one memory and the computer program code configured to, with the at least one processor, cause, at least in part, the apparatus to determine progress information for at least one device associated with at least one mode of transport, at least one route, or a combination thereof. The apparatus is also caused to determine other progress information associated with at least another mode of transport, at least another route, or a combination thereof. The apparatus is further caused to cause, at least in part, a presentation of a comparison of the progress information against the other progress information.

According to another embodiment, a computer-readable storage medium carries one or more sequences of one or more instructions which, when executed by one or more processors, cause, at least in part, an apparatus to determine progress information for at least one device associated with at least one mode of transport, at least one route, or a combination thereof. The apparatus is also caused to determining other progress information associated with at least another mode of transport, at least another route, or a combination thereof. The apparatus is further caused to cause, at least in part, a presentation of a comparison of the progress information against the other progress information.

According to another embodiment, an apparatus comprises means for determining progress information for at least one device associated with at least one mode of transport, at least one route, or a combination thereof. The apparatus also comprises means for determining other progress information associated with at least another mode of transport, at least another route, or a combination thereof. The apparatus further comprises means for causing, at least in part, a presentation of a comparison of the progress information against the other progress information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3E are flowcharts of processes for presenting a comparison of progress information associated with transport modes, routes, or a combination thereof, according to various embodiment;

DESCRIPTION OF SOME EMBODIMENTS

Examples of a method, apparatus, and computer program for presenting a comparison of progress information associated with transport modes, routes, or a combination thereof are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
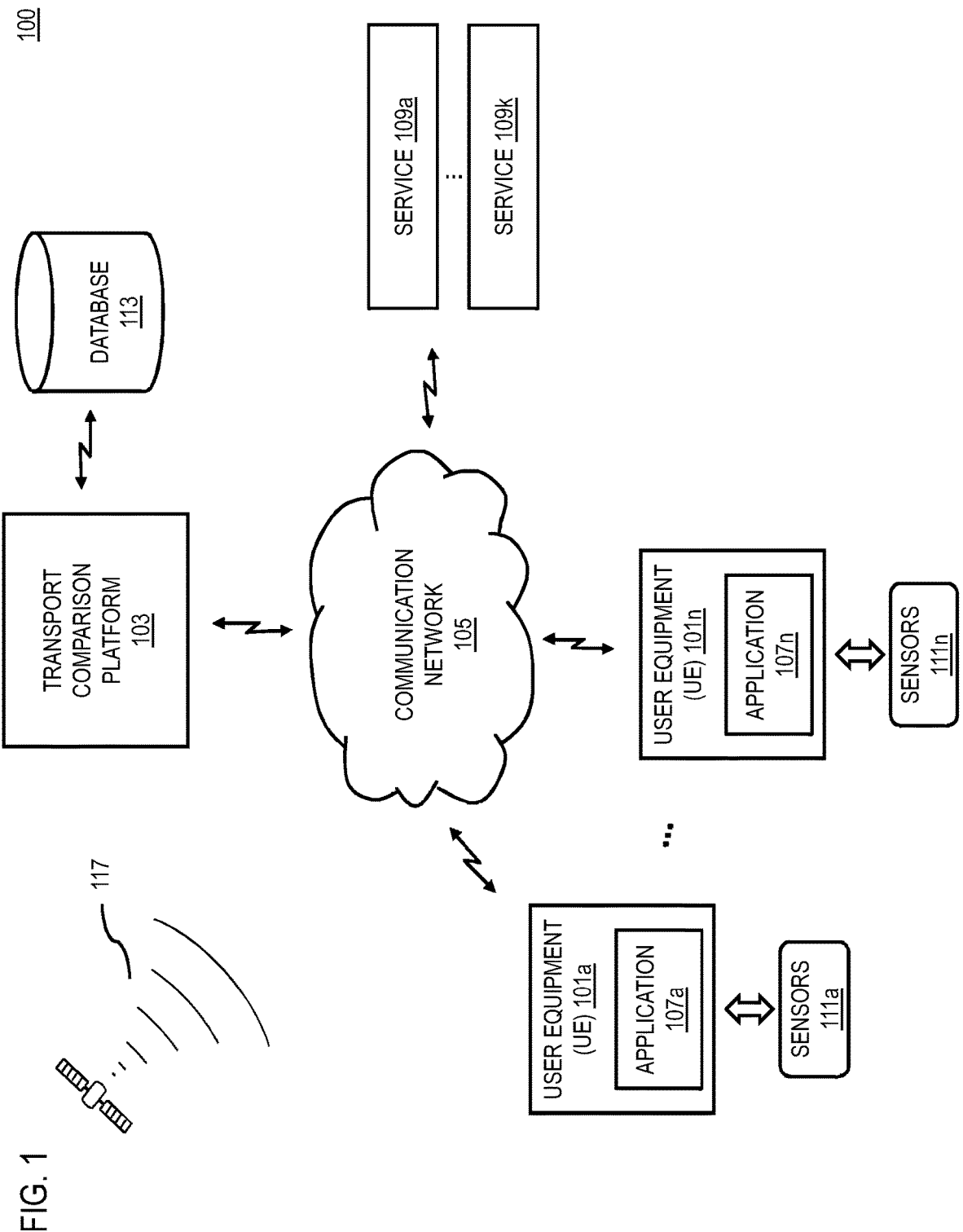
FIG. 1 is a diagram of a system capable of presenting a comparison of progress information associated with transport modes, routes, or a combination thereof, according to one embodiment.

FIG. 1 is a diagram of a system capable of presenting a comparison of progress information associated with transport modes, routes, or a combination thereof, according to one embodiment. Users of computing devices (e.g., laptops, tablet computers, mobile phones, navigation systems, etc.) often rely upon trip planning applications using global positioning system (GPS) to find out possible transport modes (e.g., car, bus, train, bicycle, walk, etc.) or routes (e.g., different highways, local roads, etc.) to a destination. In general, these trip planning applications identify and present the possible transport modes or routes upon user input for user comparison before the start of the trip, allowing users to choose a transport mode or route based on predicted travel time. Then, the users usually choose a transport mode or routes presented as the fastest. However, actual travel times associated with transport modes or routes are often different from travel times predicted by such applications (e.g., due to unexpected events or other factors that were not considered). For example, accidents and bad weather are factors that can increase the actual travel time associated with a transport mode or route. Nonetheless, those factors may not have been considered by the trip planning application when the predicted travel time associated with the transport mode or route was initially calculated. Further, during or after the trip, the users often doubt whether the chosen transport mode or route is really the fastest way to reach their destination and wonder what it would have been like if they have chosen another transport mode or route. In addition, because users are typically limited to knowing the actual travel time of the transport mode or route taken, they are unable to make well-informed decisions in the future with respect to transport mode or route selections.

To address this problem, a system 100 of FIG. 1 introduces the capability to present comparison of progress information associated with transport modes, routes, or a combination thereof. More specifically, the system 100 may present a comparison of progress information for one device (e.g., laptops, tablet computers, mobile phones, navigation systems, etc.) associated with one transport mode, route, or a combination thereof against other progress information associated with another transport mode, route, or a combination thereof, thereby enabling the users to compare the one transport mode or route with another transport mode or route. By way of example, the progress information may be determined based on location information associated with the one device, and the other progress information may be determined based on other location information associated with the another device along with a simulation associated with the another transport mode, route, or a combination thereof. In one use case, for instance, the progress information may be determined by tracking the one device while the other progress information may be determined by tracking the another device or by simulating a trip associated with the another transport mode or route. In addition, in some embodiments, the another device may be selected based on contextual similarity (e.g., same origin, destination, etc.) with the one device. Further, the progress information and the other progress information may be compared based on performance criteria (e.g., time, distance, efficiency, convenience, etc.). Then, the comparison of the progress information and the other progress information may be presented to users to inform those users in planning a trip, while on a trip, or at the end of a trip. Further, whether a route a user just took is/was the best or there is/was better route may be presented.

In certain embodiments, the one transport mode, the one route, the another transport mode, the another route, etc., may be associated with a common destination, a comparable destination, a different destination, etc. For example, if a user is travelling to a hamburger restaurant, the another transport mode or route may be associated with the same hamburger restaurant at same location (e.g., only one restaurant) as the one transport mode or route, a different hamburger restaurant at a different location (e.g., associated with a different restaurant brand), or the same hamburger restaurants in a different location (e.g., same restaurant franchise).

In certain embodiments, the system 100 may determine one or more travel milestones associated with the one device, the another device, etc. The system 100 may then cause a presentation of one or more alert messages (e.g., pop-up message, alarm, etc.) associated with the one or more travel milestones. By way of example, the one or more travel milestones may be associated with arrival at a destination or check-in at a certain location. In one scenario, for instance, when a simulated transport mode or another tracked device arrives at a destination earlier than the user, a pop-up message may notify the user of the arrival.

In certain embodiments, the system 100 may present recommendation for the best departure time based on cumulated progress information and other data information. For example, the system 100 may determine the best time to leave work based on past progress information and current traffic information. The system 100 may present on display that "It seems leaving work at 18:15 is the best option on Monday thru Thursday as it will take only 35 minutes to go home by train at cost of $2.00."

As shown in FIG. 1, the system 100 comprises a user equipment (UE) 101 (or multiple UEs 101a-101n) having connectivity to a transport comparison platform 103 via a communication network 105. The transport comparison platform 103 may, for instance, perform one or more of the following: (1) determining progress information for one device associated with one transport mode or route, (2) determining other progress information associated with another transport mode or route, (2) causing a presentation of a comparison of the progress information against the other progress information, (3) causing simulation of another transport mode or route, (4) determining the other progress information based on other location information for another device associated with another transport mode or route, (5) processing and/or facilitating a processing of the comparison to determine whether the one transport mode or route is better than the another transport mode or route based on one or more performance criteria, (6) determining one or more travel milestones associated with the one device or the another device, and (7) causing a presentation of one or more alert messages associated with the one or more travel milestones. It is noted that the transport comparison platform 103 may operate with applications 107 and services 109 via communication network 105.

In addition, as depicted, the system 100 may comprise services 109a-109k (also collectively referred as services 109). The services 109 may include traffic information providers broadcasting traffic information, social networking services allowing users to share their location information, or any other services providing other information associated with transport modes or routes. The transport comparison platform 103 may receive the traffic information, the user location information, or the other information from the services 109. For example, the social networking services may utilize other user's check-in information, updates, location-based photos to determine departure and arrival of the other users. The social networking services may allow retrieving of such information associated with friends of a user. It is noted that the services 109 may operate with the transport comparison platform 103 via the communication network 105.

As illustrated, the system 100 may also comprise applications 107a-107n (also collectively referred as applications 107) which are configured to interact with the transport comparison platform 103 and to present information received from the transport comparison platform 103. The applications 107 may include trip planning application capable of presenting information associated with transport modes or routes. For example, the applications 107 may enable UEs 101 to transmit information associated with the user (e.g., user location, user profile, etc.) to the transport comparison platform 103 and to receive information associated with the transport modes or routes. User interface (UI) implemented by the applications 107 may enable users to enter information to be transmitted to the transport comparison platform 103 and may visualize information received from the transport comparison platform 103. It is noted that the applications 107 may operate with transport comparison platform 103 via the communication network 105.

In certain embodiments, the system 100 may comprise sensors 111. The sensors 111 may include global positioning sensor, temporal sensor, motion sensor, accelerometer, gyroscope, network detection sensor, etc. The sensors 111 may be associated with the UEs 101. Also, the UEs 101 may receive sensor information from sensors 111. The sensor information may be transmitted from UEs 101 to the transport comparison platform 103.

In certain embodiments, the system 100 may comprise database 113. The database 113 may be associated with the transport comparison platform 103. The database may, for instance, include user data, transport data, and other data. Some examples of the user data may, for instance, include user profile, user location information, saved locations, trip history, selected criteria, and progress report. Some example of the transport data may include traffic information, public transportable schedule, location information of another device or users, maps, weather information, milestones, alert messages, and simulation information. In addition, the transport data may be real-time data, retroactive data, or a combination thereof.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, transport comparison platform 103, and services 109 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
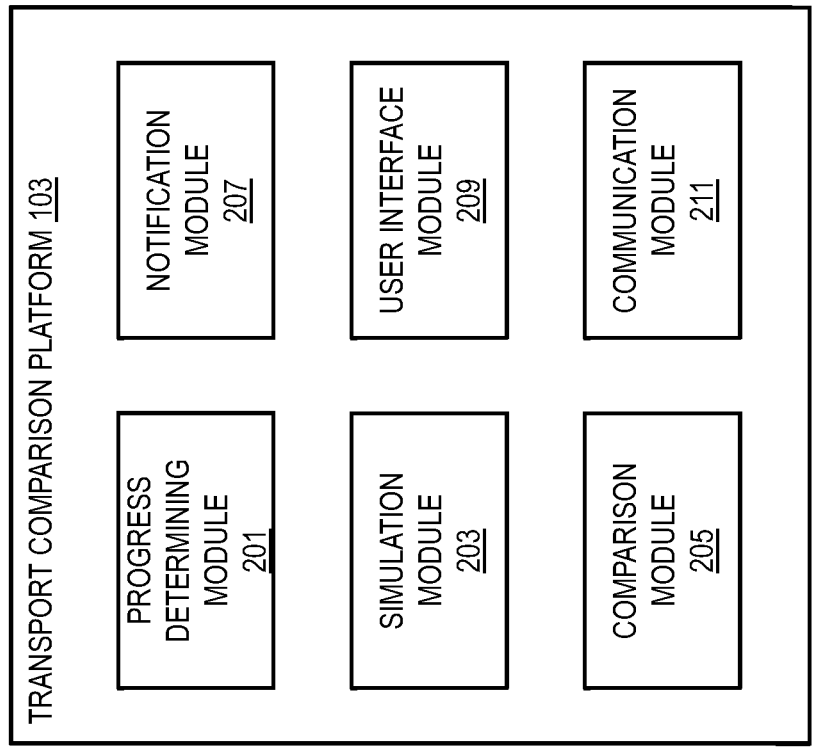
FIG. 2 is a diagram of the components of a transport comparison platform, according to one embodiment.

FIG. 2 is a diagram of the components of a transport comparison platform 103, according to one embodiment. By way of example, the transport comparison platform 103 includes one or more components for presenting a comparison of progress information associated with transport modes, routes, or a combination thereof. It is contemplated that the functions of these components may be combined in one or more components or performed by other components of equivalent functionality. In this embodiment, the transport comparison platform 103 includes a progress determining module 201, a simulation module 203, a comparison module 205, a notification module 207, a user interface module 209, and a communication module 211.

In one embodiment, the progress determining module 201 may determine progress information for one device associated with one transport mode, route, or a combination thereof based on location information associated with the one device. Also, other progress information associated with another transport mode, route, a combination thereof may be determined based on other location information associated with another device or based on a simulation associated with the another transport mode, route, or a combination thereof. For example, the progress information may be determined by tracking the one device while the other progress information may be determined by tracking the another device or by simulating a trip associated with the another transport mode or route. The another device may be selected based on contextual similarity (e.g., same origin, destination, etc.) with the one device. The progress information or the other progress information may include temporal information (e.g., time traveled or remaining), distance information (e.g., distance traveled or remaining), and efficiency information (fuel used or remaining). The progress determining module 201 may cause simulation module 203 to perform a simulation associated with the another transport mode or route. In one embodiment, the simulation module 203 may simulate a trip associated with the another transport mode, route, or a combination thereof based on the transport data. The transport data may be real-time or retroactive data. The real-time data may, for instance, include current traffic information, current public transportation schedule, current location of the another device, etc. The retroactive data may include past traffic information, past public transportation information, past travel information of the another device, etc. It is noted, however, that the simulation module 203 may also enable a determination of the other progress information without using current location information of the another device or tracking the another device In one embodiment, the comparison module 205 may compare the progress information against the other progress information based on performance criteria (e.g., to determine whether the one transport mode or route is performing better than the another transport mode or route). The performance criteria may, for instance, include a travel time criterion, (e.g., time traveled or remaining), an environmental performance criterion (e.g., distance traveled or remaining, fuel used, environmental costs, convenience, etc.), or other criteria. For example, the one transport mode or route may be compared with the another transport mode or route based on remaining time or distance at one point of the trip. In addition, convenience based on user ratings or feedback may be considered in the comparison. The comparison of the progress information and the other progress information may be performed before a trip, during the trip, or after the trip. The comparison module may determine whether a route a user just took is/was the best or there is/was better route. The comparison information may be conveyed to the notification module 207 which may trigger launching of alert messages corresponding to the comparison information. The comparison information may also be conveyed to user interface module 209 which may cause the comparison information to be graphically presented. In one embodiment, the notification module 207 may determine corresponding alert messages based on the comparison information determined by the comparison module 205 or progress information determined by the progress determining module 201. The determined alert messages may be launched and displayed thru the user interface module 209. As indicated, the alert messages may include pop-up messages, animated messages, notifications, etc.

In one embodiment, the user interface module 209 may enable presentment of a graphical user interface for presenting a comparison of progress information associated with transport modes, routes, or a combination thereof. For example, the user interface module 209 may generate the interface in response to application programming interface (APIs) or other function calls corresponding to the application 107 or UE 101, thereby enabling the display of graphics primitives, such as menus, buttons, data entry fields, etc.

Also, in certain embodiments, the user interface module 209 facilitates the rendering of alert messages associated with the progress information or the transport routes or modes. Further, the user interface module 209 may enable the presentment of progress information or information associated with the transport modes or routes. It is noted that the user interface module 209 may be configured to operate in connection with progress determining module 201, simulation module 203, comparison module 205, and notification module 207 concurrently to present the comparison of the progress information against the other progress information (e.g., via application 107 in response to user input or command).

In one embodiment, the communication module 211 enables formation of a session over a network 105 between the transport comparison platform 103 and the UEs 101. For example, the communication module 211 executes various protocols and data sharing techniques for enabling collaborative execution between UEs 101 and the transport comparison platform 103 over the network 105.

Figure 3A:
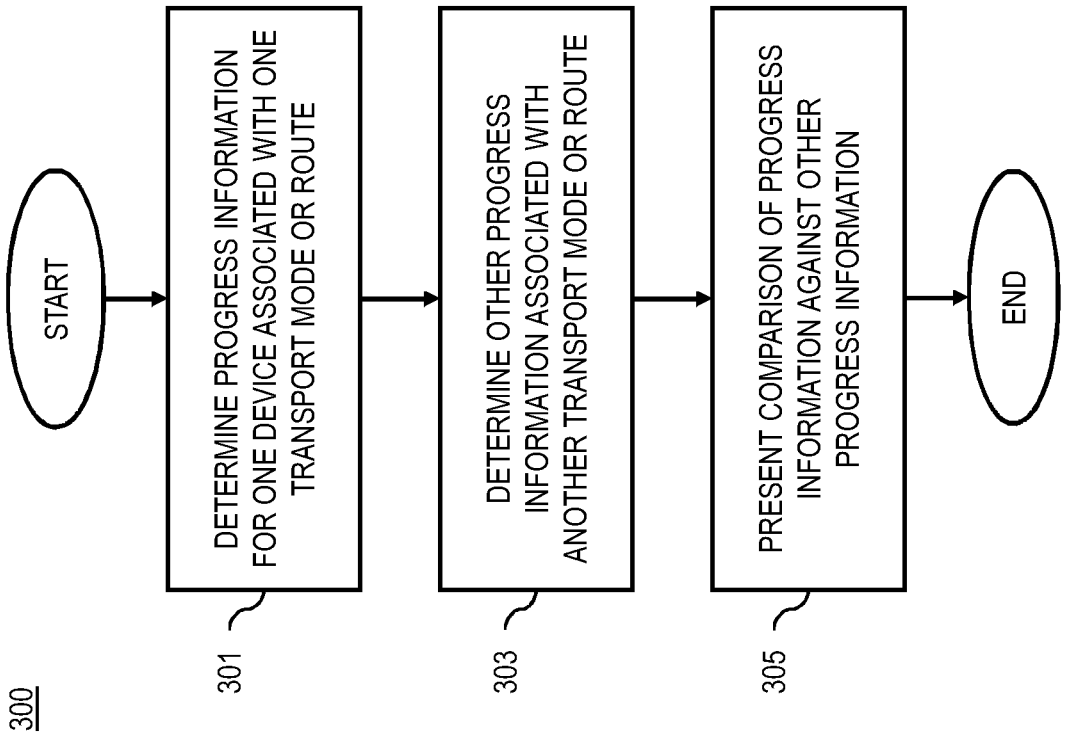
Figure 6:
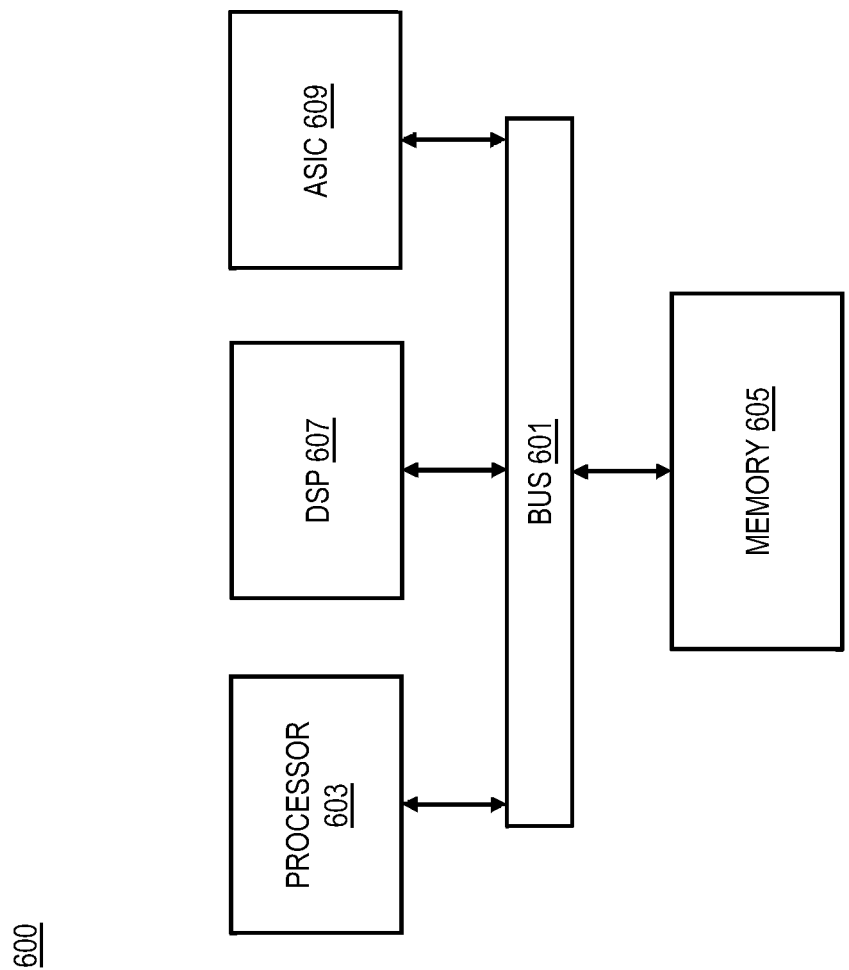
FIG. 6 is a diagram of a chip set that can be used to implement an embodiment of the invention.

FIGS. 3A-3E are flowcharts of a process for presenting a comparison of progress information associated with transport modes, routes, or a combination thereof, according to one embodiment. FIG. 3A depicts a process 300 of determining progress information for one device associated with one transport mode, route, or a combination thereof and other progress information associated with another transport mode, route, or combination thereof to present a comparison of the progress information against the other progress information. In one embodiment, the transport comparison platform 103 performs the process 300 and is implemented in, for instance, a chip set including a processor and a memory as shown in FIG. 6.

In step 301, the transport comparison platform 103 may determine progress information for one device associated with one transport mode or route. For example, the transport comparison platform 103 may determine location information of the one device and transport information associated with the one transport mode or route. Based on the location information and the transport information, the transport comparison platform 103 may determine the progress information for the one device. The progress information may, for instance, include temporal information (e.g., time traveled or remaining), distance information (e.g., distance traveled or remaining), efficiency information (e.g., fuel used or remaining), etc.

In step 303, the transport comparison platform 103 may determine other progress information associated with another transport mode or route. For example, the transport comparison platform 103 may determine other location information of the another device and transport information associated with another transport mode or route. Based on the other location information of the another device and the transport information, the transport comparison platform 103 may determine the other progress information. Also, as indicated, the transport comparison platform 103 may simulate a trip to determine the other progress information (e.g., process 310). The other progress information may include temporal information (e.g., time traveled or remaining), distance information (e.g., distance traveled or remaining), efficiency information (e.g., fuel used or remaining), etc.

In step 305, the transport comparison platform 103 may present a comparison of the progress information against the other progress information. For example, the transport comparison platform 103 may compare the progress information against the other progress information based on performance criteria (e.g., process 330). The performance criteria may, for instance, include a travel time criterion, (e.g., time traveled or remaining), an environmental performance criterion (e.g., distance traveled or remaining, fuel used, environmental costs, convenience, etc.), or other criteria. The comparison of the progress information against the other progress information may be presented thru the UI (e.g., map, or comparison board) for user comparison and selection.

Figure 3C:
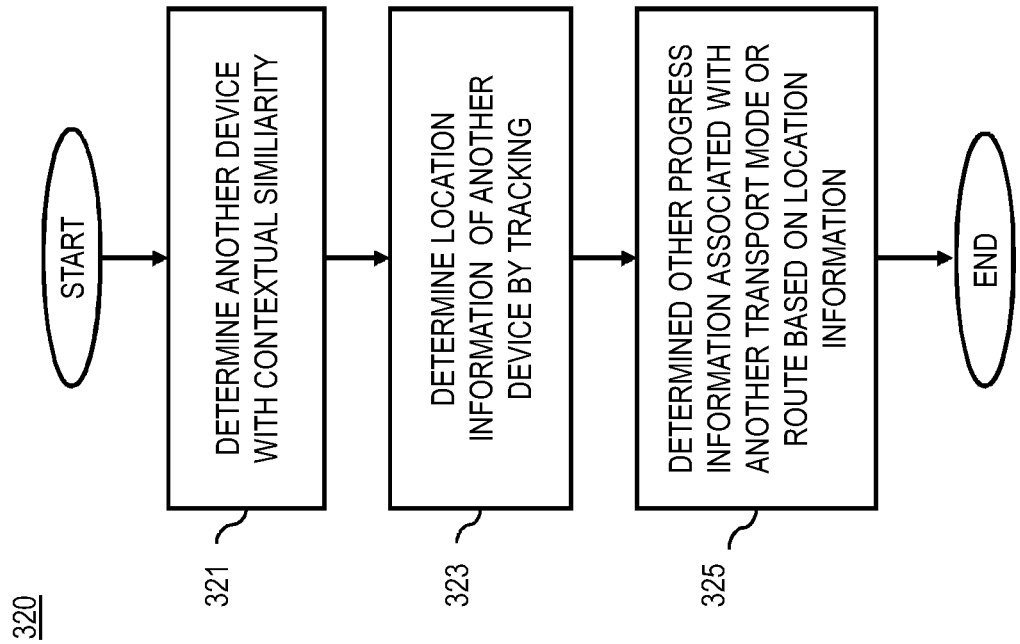
Figure 3B:
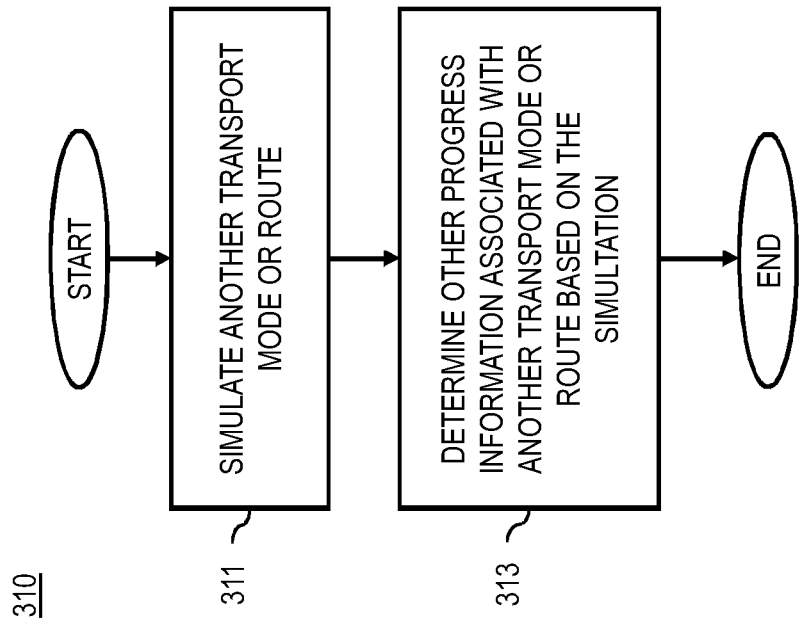

FIG. 3B depicts a process 310 of performing simulation to determine other progress information associated with another transport more or route based on the simulation. In one embodiment, the transport comparison platform 103 performs the process 310 and is implemented in, for instance, a chip set including a processor and a memory as shown in FIG. 6. In step 311, the transport comparison platform 103 may simulate a trip associated with the another transport mode or route. The trip may be simulated by constantly determining and updating the location information of a virtual user or device based on real-time data, retroactive data, or a combination thereof. The real-time data may include current or dynamic traffic information, public transportation schedule, location of another user or devices, etc. The retroactive data may include past or static traffic information, public transportation schedule, travel history of another user or device, etc.

In step 313, the transport comparison platform 103 may determine other progress information associated with another transport mode or route based on the simulation 311. The other progress information may be determined based on the location information of the virtual user or device and transport information associated with another transport mode or route. The transport information may include speed of the mode, schedule of the mode, distance of the route, events associated with the route, etc.

FIG. 3C depicts a process 320 of using other location information of another device to determine the other progress information. In one embodiment, the transport comparison platform 103 performs the process 320 and is implemented in, for instance, a chip set including a processor and a memory as shown in FIG. 6. In step 321, the transport comparison platform 103 may determine another device with contextual similarity as the one device. The transport comparison platform 103 may determine travel information for the one device and identify another device with same or similar travel information. The travel information may include origin, destination, type of mode, route used, time left the origin, etc.

In step 323, the transport comparison platform 103 may determine location information of the another device by tracking. After another device with contextual similarity is determined 321, location information associated with the another device may be determined by tracking the another device. The tracking may be performed by constantly receiving and updating the location of the another device. By way of example, the location of another device may be determined based on GPS technology.

In step 325, the transport comparison platform 103 may determine other progress information associated with another transport mode or route based on the location information of the another device determined 323. The other progress information may be determined based on the location information of the another device and the transport information associated with the another transport mode or route. The transport information may include speed of the mode, schedule of the mode, distance of the route, events associated with the route, etc.

FIG. 3D depicts a process 330 of comparing one transport mode or route against another transport mode or route to determine which one performs better. In one embodiment, the transport comparison platform 103 performs the process 330 and is implemented in, for instance, a chip set including a processor and a memory as shown in FIG. 6.

In step 331, the transport comparison platform 103 may compare one transport mode or route with another transport mode or route based on performance criteria. Computational logic may be used for the comparison. The performance criteria may be selected by the user or given as default. As mentioned, the performance criteria may include a travel time criterion, (e.g., time traveled or remaining), an environmental performance criterion (e.g., distance traveled or remaining, fuel used, environmental costs, convenience, etc.), or other criteria. The comparison may be extended to long distance trips including trips by flights. For example, a user's trip to Paris with one airline, which took 7 hours and cost $600, may be compared with other trip to Paris with other airline (but departing at same time), which may only take 4 hours and cost $400.

In step 333, the transport comparison platform 103 may determine whether the one transport mode or route performs better than the another transport mode or route based on the comparison (e.g., step 331). If the one transport mode or route is/was not the best, the transport comparison platform 103 may determine which route is/was the best. For example, if the remaining time for one mode or route is less than the remaining time for another mode or route, the one mode or route is determined as better than the another mode or route under the temporal criteria. Also, if the consumed fuel for the one mode or route is more than the consumed fuel for the another mode or route, the another mode or route is determined as the better mode or route under the efficiency criteria.

FIG. 3E depicts a process 340 of determining travel milestone associated with one device or another device to present alert messages associated with the travel milestone. In one embodiment, the transport comparison platform 103 performs the process 340 and is implemented in, for instance, a chip set including a processor and a memory as shown in FIG. 6. In step 341, the transport comparison platform 103 may determine a travel milestone associated with one device or another device. As mentioned, the travel milestone may include an arrival at a destination, check-in at a place, or any other information associated with certain location. By way of example, the travel milestone may be determined when one device is near a location associated with the travel milestone or when the travel milestone associated with another device is generated. The travel milestone may, for instance, be generated when another user check-in at a place, arrives at a destination, or creates the other information associated with a certain location.

In step 343, the transport comparison platform 103 may present an alert message associated with the travel milestone. The alert message may be triggered when the travel milestone is determined. For example, if another user arrives at a destination earlier than one user, a pop-up message may notify the user of the arrival. Also, when the one user is near a place associated with a travel milestone, the pop-up message may notify the user of information associated with the travel milestone (e.g., time another mode or user passed the location or checked-in at the place).

FIGS. 4A-4D are diagrams of user interfaces utilized in the processes of FIGS. 3A-3E, according to various embodiments. For the purpose of illustration, the diagrams are described with respect to an exemplary case of transport comparison platform 103 presenting a comparison of progress information associated with transport modes, routes, a combination thereof via a UE 101.

Figure 4A:
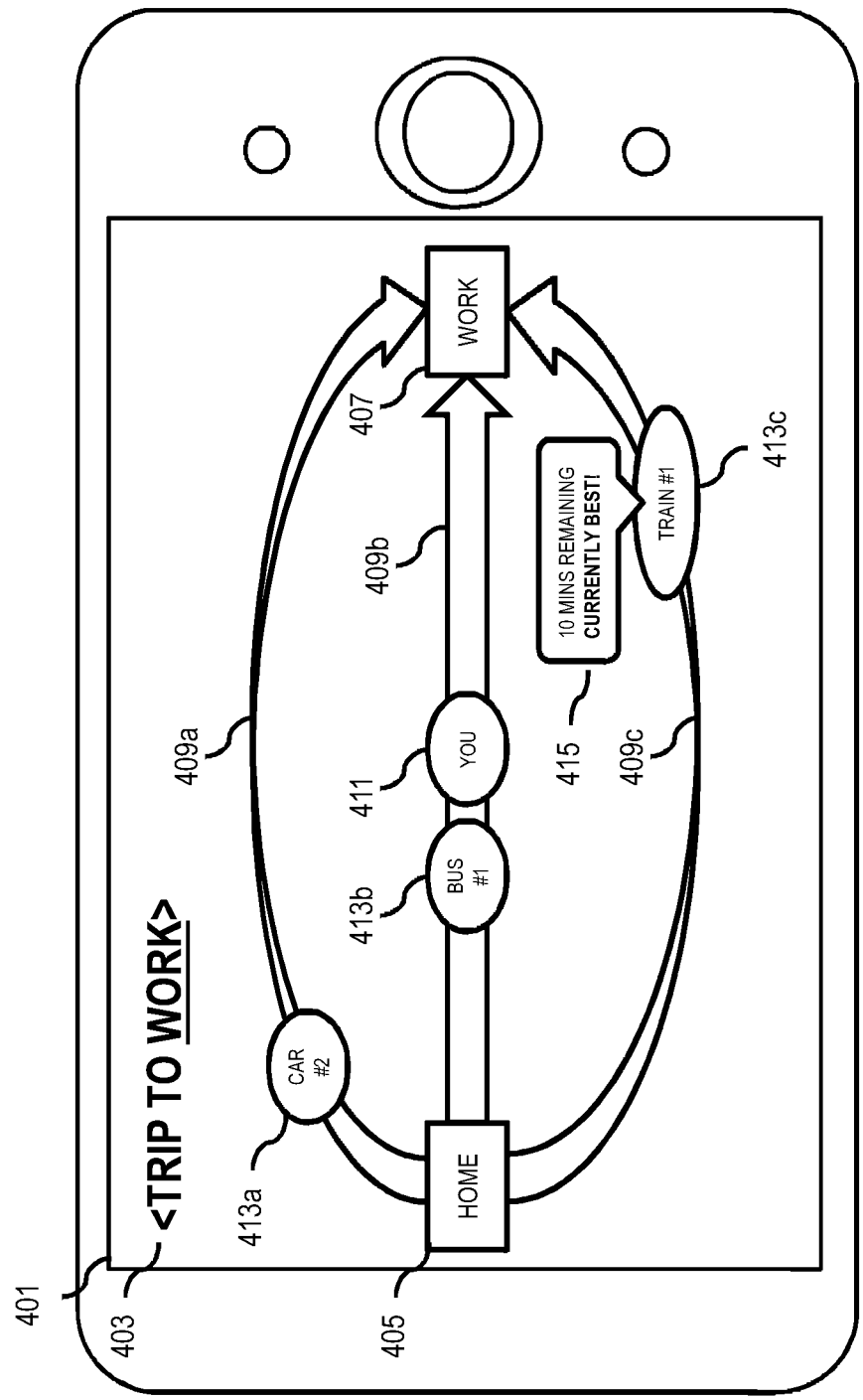
FIGS. 4A-4D are diagrams of user interfaces for presenting a comparison of progress information associated with transport modes, routes, or a combination thereof, according to various embodiments.

FIG. 4A depicts one embodiment in which comparison of progress information associated with transport modes, routes, a combination thereof to one destination is presented on a UE 101. The UE 101 may visualize the comparison in a comparison map 401 thru the application 107. The comparison map 401 may include a title of a trip 403, an origin 405, a destination 407, one or more routes 409a-409c (collectively 409) from the origin 405 to the destination 407, an indicator of user location (or one device or mode location) 411, and one or more indicators of another devices or modes locations 413a-413b (collectively 413), and one or more alert messages 415. As shown, in FIG. 4A, the user's trip (YOU) is better than other two trips (CAR #2 and BUS #1) and worse than another trip (TRAIN #1). In addition, a pop-up message notifies the user that the another trip (TRAIN #1) is currently the best way to reach the destination with a remaining time of 10 minutes.

Figure 4B:
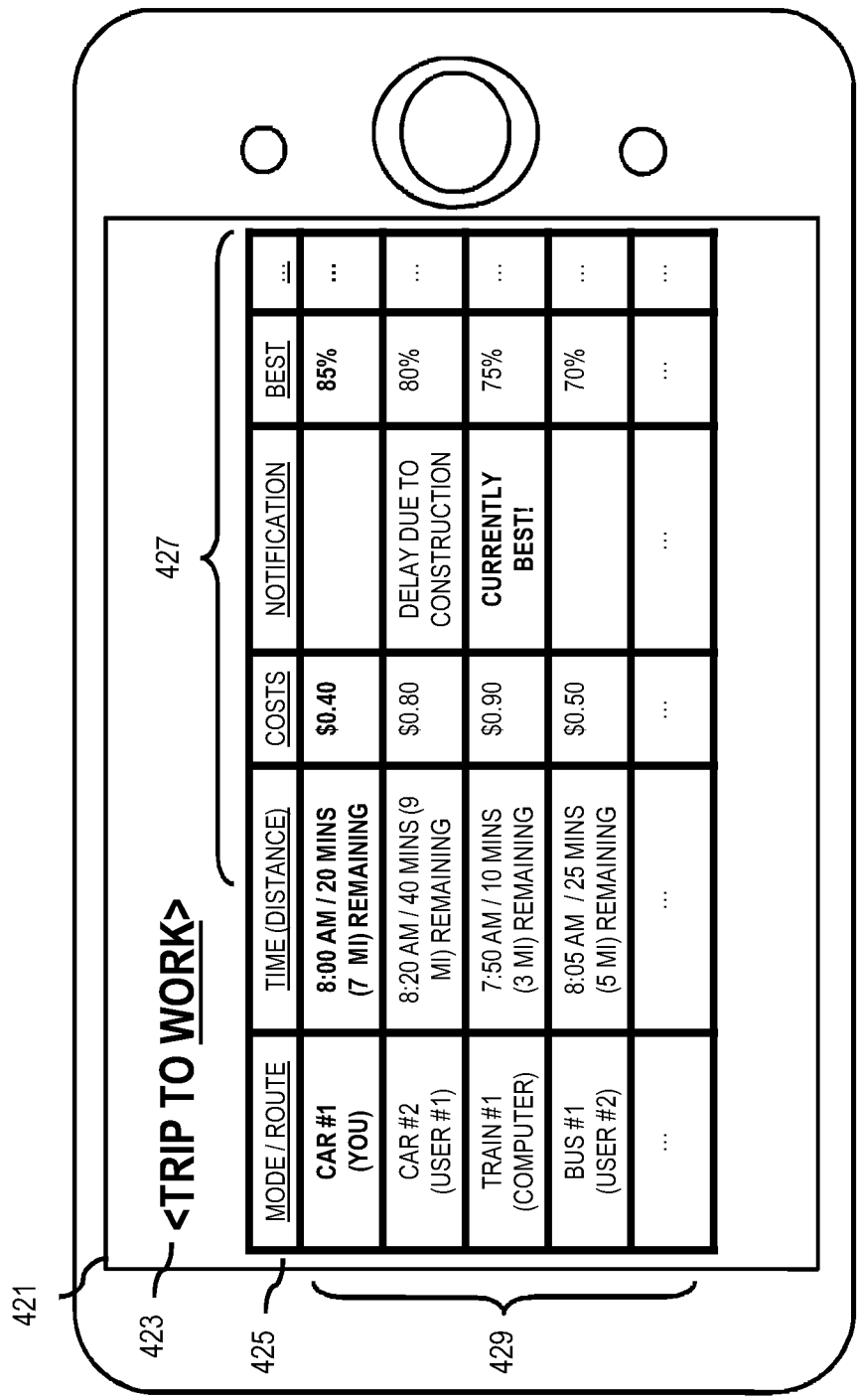

FIG. 4B depicts another embodiment in which comparison of progress information associated with transport modes, routes, a combination thereof to one destination is presented on a UE 101 in respect to FIG. 4A under same scenario. The UE 101 may display the comparison in a comparison board 421 via the application 107. The comparison board 421 includes a title of a trip 423, a comparison table 425, comparison criteria 427, and different trips 429. In addition, FIG. 4B illustrates an example of a comparison table 425, where comparable information for different trips 429 is displayed in regard to the comparison criteria 427 (e.g., MODE/ROUTE, TIME (DISTANCE), COSTS, NOTIFICATION, BEST, etc.) As an example, TRAIN #1 is presented as a simulated trip (COMPUTER) with a remaining time of 10 minutes to the work and costs of 90 cents. The alert message for the TRAIN #1 indicates that the trip is currently the best way to get to the work. Also, the comparison board 421 indicates that the TRAIN #1 has been the best way to the work for 75% of the time.

Figure 4C:
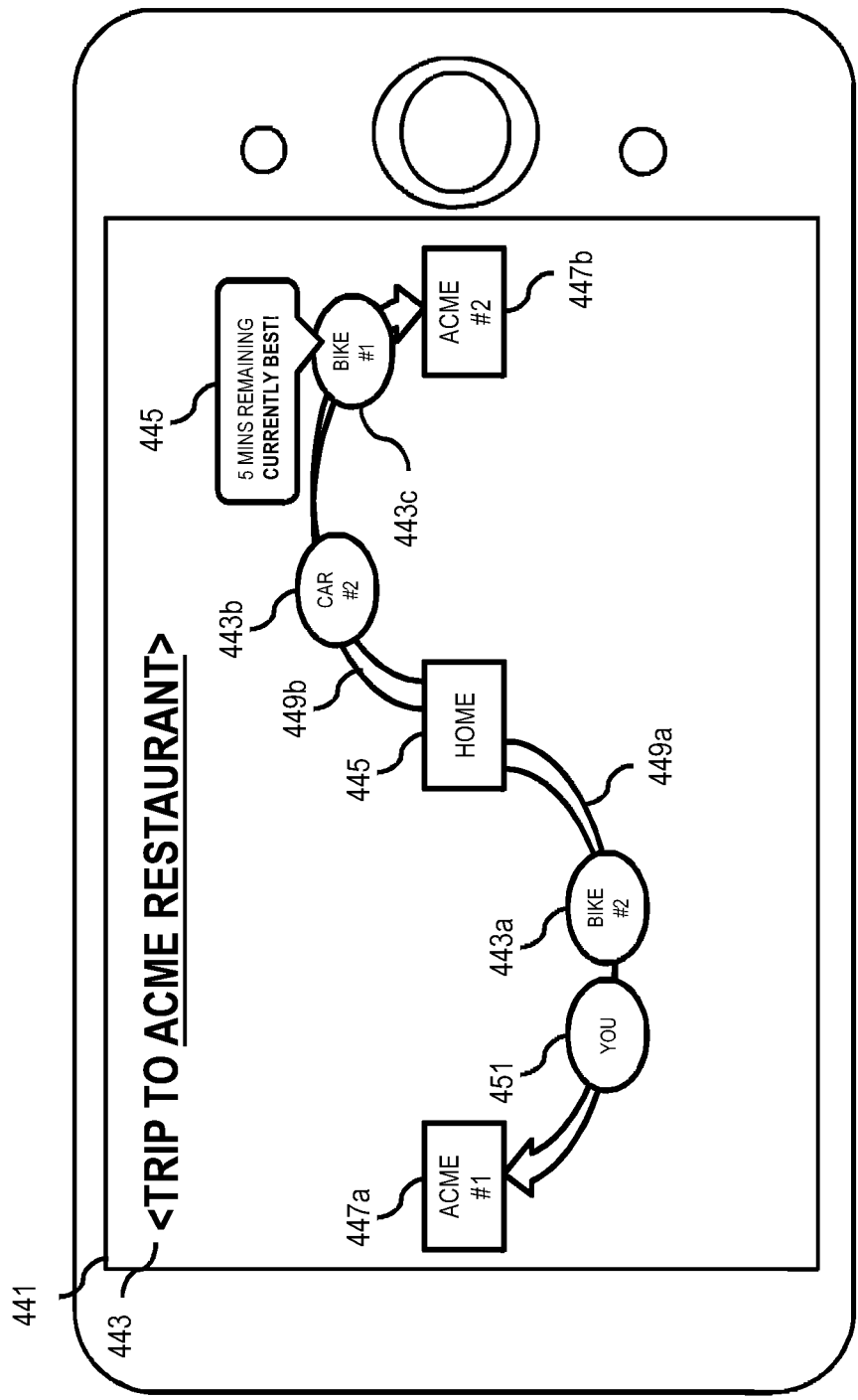

FIG. 4C depicts one embodiment in which comparison of progress information associated with transport modes, routes, a combination there having different destinations is presented on a UE 101. The UE 101 may visualize the comparison in a comparison map 441 thru the application 107. The comparison map 441 include a title of a trip 443, an origin 445, one or more destinations 447 (here, 447a-447b), one or more routes 409a-409b (collectively 409) from the origin 445 to the different destinations 447, an indicator of user location (or one device or mode location) 451, and one or more indicators of another devices or modes locations 443a-443b (collectively 443), and one or more alert messages 415. Moreover, FIG. 4C illustrates an exemplary scenario where the user's trip (YOU) is better than other trip (CAR #2 and BIKE #2) and worse than another mode or route (BIKE #1). Also, a pop-up message notifies the user that the another trip (BIKE #1) is currently the best way to reach the destination with a remaining time of 5 minutes.

Figure 4D:
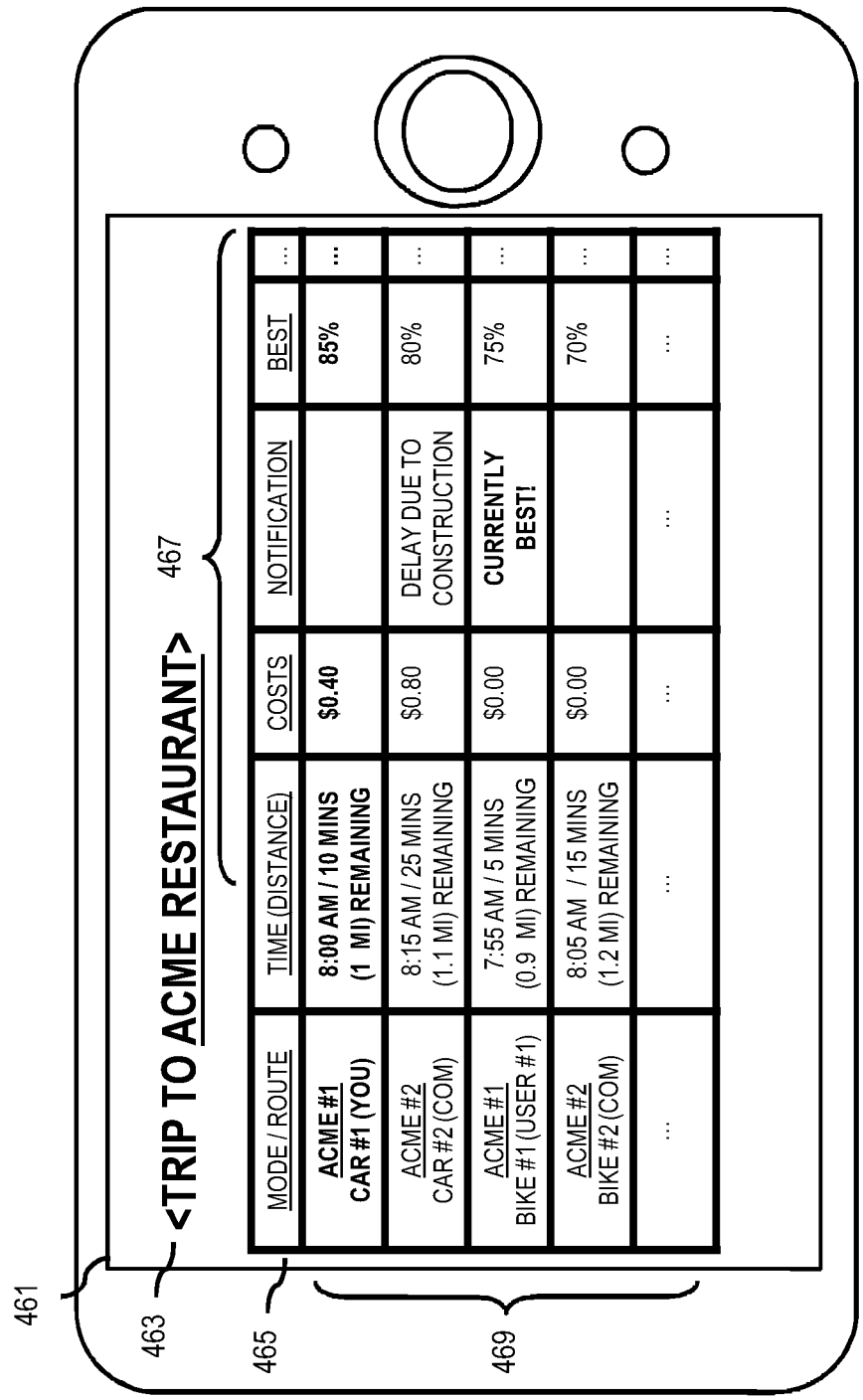

FIG. 4D depicts another embodiment in which comparison of progress information associated with transport modes, routes, a combination there having different destinations is presented on a UE 101 in respect to FIG. 4C under same scenario. The UE 101 displays the comparison in a comparison board 461 via the application 107. The comparison board 461 includes a title of a trip 463, a comparison table 465, comparison criteria 467, and different trips 469. Furthermore, FIG. 4D provides an example of a comparison table 465, where comparable information for different trips 467 is displayed in regard to the comparison criteria 467 (e.g., MODE/ROUTE, TIME (DISTANCE), COSTS, NOTIFICATION, BEST, etc.). As an example, a trip to ACME #1 by BIKE #1 is shown as a travel mode of another user (USER #1) with a remaining time of 5 minutes to the ACME #1 restaurant at no cost. The alert message for the trip to ACME #1 by BIKE #1 indicates that the trip is currently the best way to get to an ACME restaurant. Also, the comparison board 461 illustrates that the trip has been the best way to the destination for 75% of the time.

The processes described herein for presenting a comparison of progress information associated with transport modes, routes, or a combination thereof may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
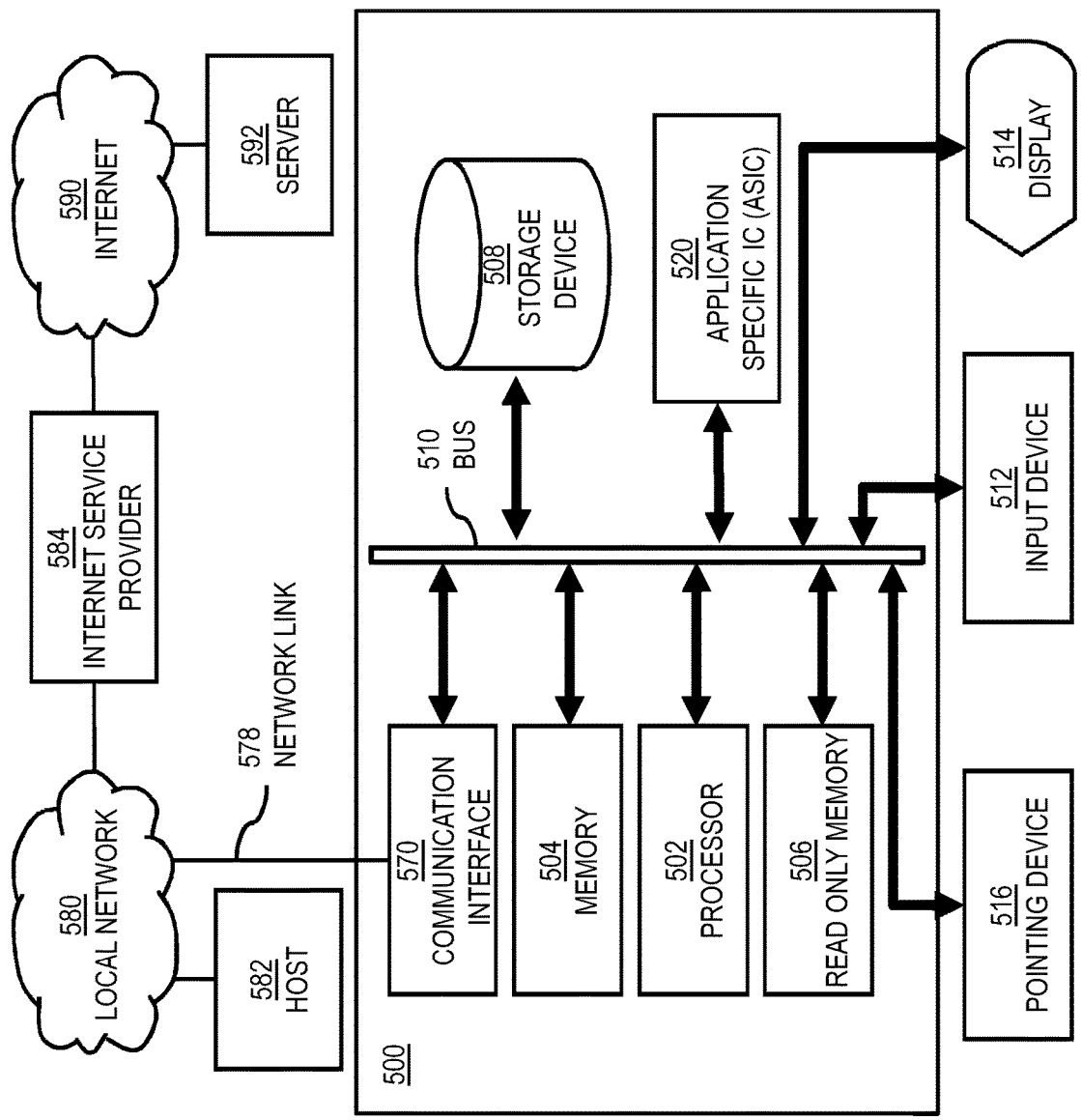
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to present comparison of progress information associated with transport modes, routes, or a combination thereof as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of presenting a comparison of progress information associated with transport modes, routes, or a combination thereof.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to present comparison of progress information associated with transport modes, routes, or a combination thereof. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for presenting a comparison of progress information associated with transport modes, routes, or a combination thereof. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for presenting a comparison of progress information associated with transport modes, routes, or a combination thereof, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for presenting a comparison of progress information associated with transport modes, routes, or a combination thereof to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to present comparison of progress information associated with transport modes, routes, or a combination thereof as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of presenting a comparison of progress information associated with transport modes, routes, or a combination thereof.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or another special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to present comparison of progress information associated with transport modes, routes, or a combination thereof. The memory 605 also stores the data associated with or generated by the execution of the inventive steps.

Figure 7:
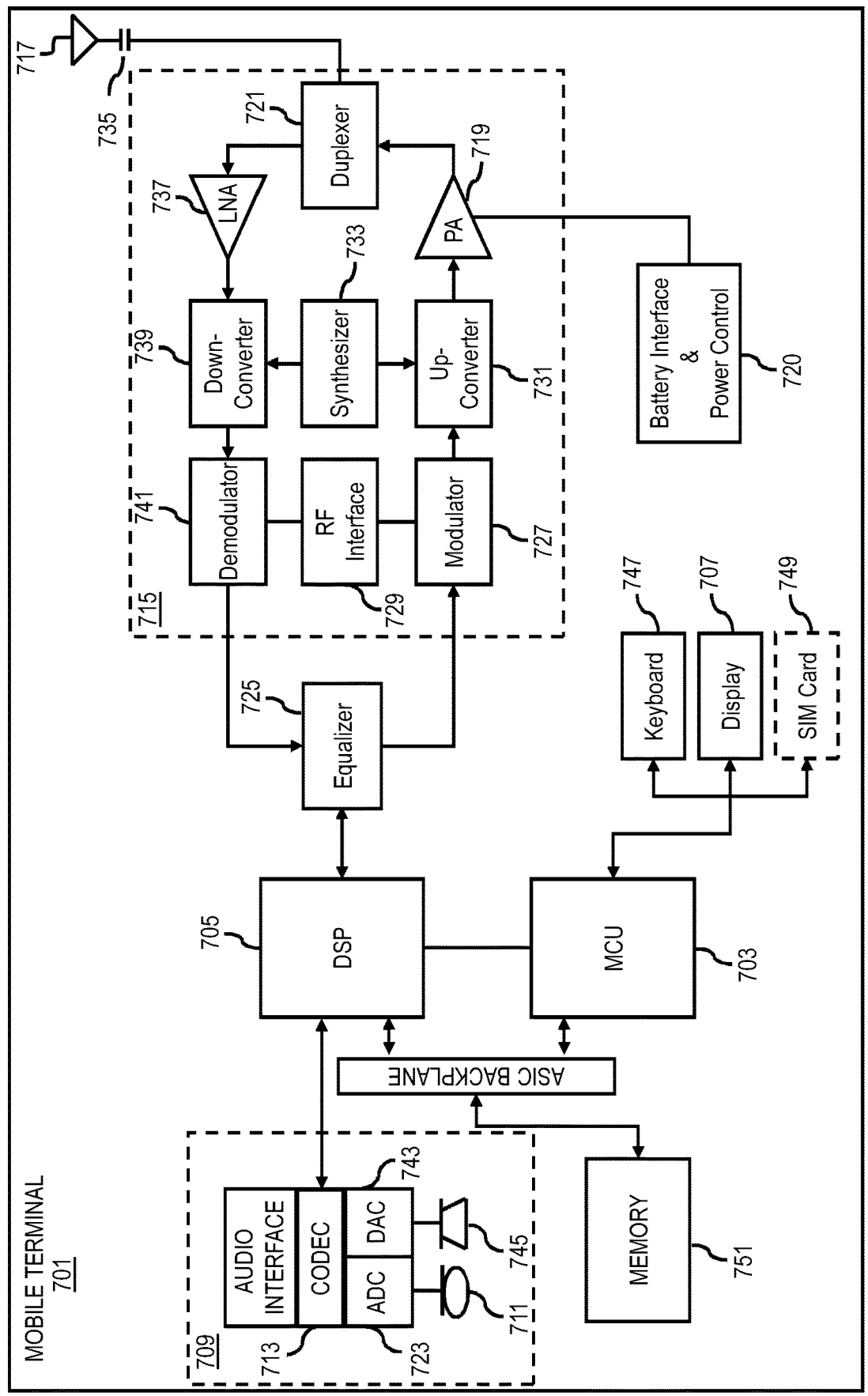
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of present comparison of progress information associated with transport modes, routes, or a combination thereof. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of presenting a comparison of progress information associated with transport modes, routes, or a combination thereof. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to present comparison of progress information associated with transport modes, routes, or a combination thereof. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may include, but is not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

providing a user device progress information regarding an actual route being taken by a user of the user device from an origin to a destination; and providing the user device progress information about an alternative route from the origin to the destination, wherein the progress information about the alternative route from the origin to the destination is based, at least in part, on location information associated with at least another user device traveling from the origin to the destination via the alternative route, wherein the progress information comprises a comparison of travel times of the actual route being taken by the user of the user device and the alternative route being taken by the at least another user device and includes at least start time from the origin and time remaining to the destination for each of the actual route and the alternative route, and wherein the alternative route is different from the actual route taken by the user of the user device from the origin to the destination.

2. The method of claim 1, wherein the comparison of travel times of the actual route and the alternative route is performed before a trip from the origin to the destination, during the trip from the origin to the destination, and after the trip from the origin to the destination.

3. The method of claim 1, wherein the alternative route is determined using real time traffic conditions that would have been encountered along the alternative route.

4. The method of claim 1, further comprising:
providing for the actual and the alternative route, one of mode of transport information, fuel efficiency information, a travel cost information, or a combination thereof.

5. The method of claim 1, further comprising:
selecting a best route from the actual and alternative routes based on performance criteria.

6. A method comprising:
providing a user device progress information regarding an actual route being taken by a user of the user device from an origin to a destination;
providing the user device progress information about an alternative route from the origin to the destination,
wherein the progress information about the alternative route from the origin to the destination is based, at least in part, on location information associated with at least another user device traveling the alternative route from the origin to the destination, and
wherein the alternative route is different from the actual route taken by the user of the user device from the origin to the destination,
determining one or more travel milestones associated with the user device or the another user device; and
causing a presentation of an alert message upon completion of the one or more travel milestones.

7. An apparatus comprising:
at least one processor; and
at least one memory including computer program code for one or more programs, the at least one memory and the computer program code configured to, with the at least one processor, cause the apparatus to perform at least the following,
provide a user device progress information regarding an actual route being taken by a user of the user device from an origin to a destination; and
provide the user device progress information about an alternative route from the origin to the destination,
wherein the progress information about the alternative route from the origin to the destination is based, at least in part, on location information associated with at least another user device traveling from the origin to the destination via the alternative route,
wherein the progress information comprises a comparison of travel times of the actual route being taken by the user of the user device and the alternative route being taken by the at least another user device and includes at least start time from the origin and time remaining to the destination for each of the actual route and the alternative route, and
wherein the alternative route is different from the actual route taken by the user of the user device from the origin to the destination.

8. The apparatus of claim 7, wherein the comparison of travel times of the actual route and the alternative route is performed before a trip from the origin to the destination, during the trip from the origin to the destination, and after the trip from the origin to the destination.

9. The apparatus of claim 7, wherein the alternative route is determined using real time traffic conditions that would have been encountered along the alternative route.

10. An apparatus comprising:
at least one processor; and
at least one memory including computer program code for one or more programs, the at least one memory and the computer program code configured to, with the at least one processor, cause the apparatus to perform at least the following,
provide a user device progress information regarding an actual route being taken by a user of the user device from an origin to a destination;
provide the user device progress information about an alternative route from the origin to the destination,
wherein the progress information about the alternative route from the origin to the destination is based, at least in part, on location information associated with at least another user device traveling the alternative route from the origin to the destination, and
wherein the alternative route is different from the actual route taken by the user of the user device from the origin to the destination, and
present the comparison in a comparison board at the user device.

11. The apparatus of claim 10, wherein the comparison board comprises, for the actual route and for the alternative route, one of mode of transport information, fuel efficiency information, a travel cost information, or a combination thereof.

12. The apparatus of claim 10, wherein the apparatus is further caused to:
select a best route from the actual and alternative routes based on performance criteria.

13. The apparatus of claim 7, wherein the apparatus is further caused to:
determine one or more travel milestones associated with the user device or the another user device; and
present an alert message upon completion of the one or more travel milestones.

14. A system comprising a plurality of user devices and a transport comparison platform, said transport comparison platform configured to:
provide to a first user device of the plurality of devices progress information regarding an actual route being taken by a user of the first user device from an origin to a destination; and
provide to the first user device progress information about an alternative route from the origin to the destination,
wherein the progress information about the alternative route from the origin to the destination is based, at least in part, on location information associated with at least a second user device of the plurality of user devices traveling from the origin to the destination via the alternative route,
wherein the progress information comprises a comparison of travel times of the actual route being taken by the user of the first user device and the alternative route being taken by the second user device and includes at least start time from the origin and time remaining to the destination for each of the actual route and the alternative route, and wherein the alternative route is different from the actual route taken by the user of the first user device from the origin to the destination.

15. The system of claim 14, wherein the comparison of travel times of the actual route and the alternative route is performed before a trip from the origin to the destination, during the trip from the origin to the destination, and after the trip from the origin to the destination.

16. The system of claim 14, wherein the alternative route is determined using real time traffic conditions that would have been encountered along the alternative route.

17. The system of claim 14, wherein the transport comparison platform is further configured to:
provide, for the actual and the alternative route, one of mode of transport information, fuel efficiency information, a travel cost information, or a combination thereof.

18. The system of claim 14, wherein the transport comparison platform is further configured to:
select a best route from the actual and alternative routes based on performance criteria.

19. The system of claim 14, wherein the transport comparison platform is further configured to:
determine one or more travel milestones associated with the first user device or second user device; and
cause a presentation of an alert message upon completion of the one or more travel milestones.

* * * * *